United States Patent [19]

Belcher

[11] 4,284,845
[45] Aug. 18, 1981

[54] PEST ELIMINATOR

[76] Inventor: Claude A. Belcher, 4456 Arch, San Diego, Calif. 92116

[21] Appl. No.: 61,597

[22] Filed: Jul. 30, 1979

[51] Int. Cl.³ .............................................. G08B 3/00
[52] U.S. Cl. ................................. 179/1 R; 340/384 E
[58] Field of Search .......... 179/1 R; 116/22 R, 22 A, 116/24; 340/384 E; 331/47, 64

[56] References Cited

U.S. PATENT DOCUMENTS

| | | | |
|---|---|---|---|
| 3,636,559 | 1/1972 | Del Grande et al. | 340/384 E |
| 3,683,113 | 8/1972 | Stewart | 179/1 R |
| 3,838,418 | 9/1974 | Brown | 340/384 E |
| 3,872,472 | 3/1975 | Moschgat | 340/384 E |
| 3,893,106 | 7/1975 | Schulein | 340/384 E |
| 4,001,817 | 1/1977 | Squires | 340/384 E |
| 4,186,387 | 1/1980 | Moschgat | 340/384 E |

Primary Examiner—Bernard Konick
Assistant Examiner—Randall P. Myers
Attorney, Agent, or Firm—Ralph S. Branscomb

[57] ABSTRACT

A device for freeing an area of birds, insects, or other pests which simultaneously emits two separate audio frequencies which are shifted periodically. The device comprises two separate oscillators whose output signals are mixed together at the input of a power amplifier driving a loud speaker. The frequency of each oscillator can be independently adjusted. A resistive load is placed in the common power supply line of the two oscillators and is periodically shunted in order to shift the frequency of both oscillators. The periodical shunting of the load is accomplished by a SCR switch driven by a third oscillator having a very low frequency. The resulting dual frequency pulsating signal can be adjusted with wide ranges of frequencies in order to deter various types of animals from frequenting the area.

5 Claims, 2 Drawing Figures

PEST ELIMINATOR

BACKGROUND OF THE INVENTION

It has long been known that animals are sensitive to various audio frequencies within or without the range audible by man. Different species of animals are responsive to signals of widely different frequency ranges. The effects of audio signals on various species are also of widely different types. For instance, certain insects and in particular, moths, may be affected in their ability to fly. Certain animals lose their sense of direction. In the case of mosquitos, it is known that only the egg-laden female needing blood to feed her eggs will bite. Once mated, the female avoids the male. A device sending out a special audio signal which simulates the hum of a male mosquito can be very effective in clearing an area from the blood-thirsty female. Therefore, there is need for a versatile pest repelling apparatus which can be programmed to affect various types of pests by emitting simultaneously different audio signals directed toward different specific species of animals.

SUMMARY OF THE INVENTION

The principal object of this invention is to provide a device capable of emitting simultaneously several signals of different frequencies which can be used efficiently to rid an area of different species of pests. Another object of the invention is to provide such a repelling device with adjustable means for setting the desired audio frequencies. A further object of this invention is to provide such device whereby different pulsating signal patterns can be generated. These and other objects are accomplished, according to this invention, by a audio signal generator which includes two oscillators having separately adjustable frequency ranges which can be periodically shifted.

DESCRIPTION OF THE PREFERRED EMBODIMENT OF THE INVENTION

Figure 1:
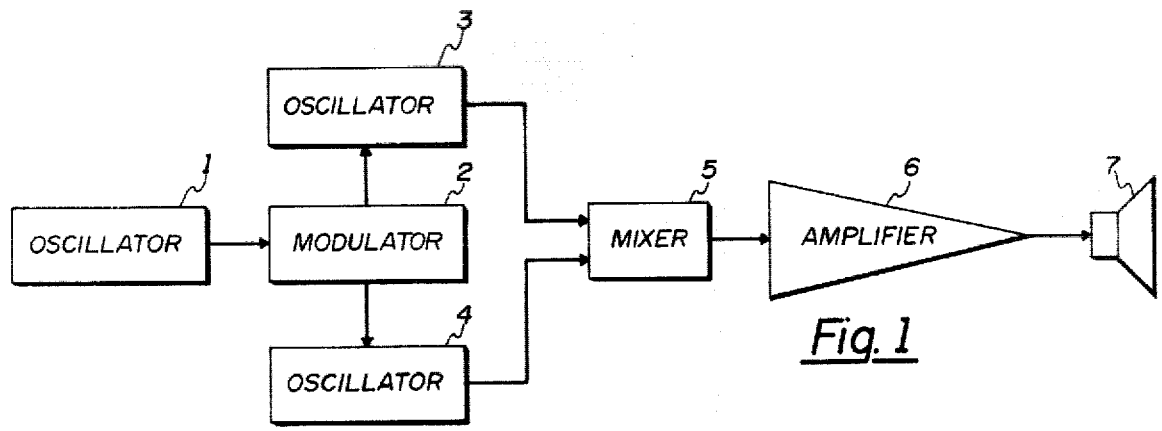
FIG. 1 is a functional block diagram of the device illustrating its basic elements.

Referring now to the drawing, and according to the invention, there is illustrated a multiple audio frequency generator effective in repelling various species of birds, insects and other pests. As more specifically illustrated in the block diagram of FIG. 1, the device comprises two distinct oscillators 3 and 4 whose outputs are combined in a mixer 5 and applied to a power amplifier 6 driving a loud speaker 7. Additional oscillators could be used in parallel with the two illustrated herein in order to create a composite audio signal of more than two components. The two oscillators 3 and 4 have base frequencies which are within the audio range, including frequencies both audible and inaudible to human ears from approximately 8 hertz to about 25 kilohertz. The amplifier may be implemented with any good quality audio amplifier having a substantially flat response within this frequency range, and an output power from one to ten watts according to the size of the area to be ridden of pests. The current supply to the oscillators 3 and 4 is controlled by a modulator 2 which is responsive to the output of a square wave oscillator 1 whose frequency is adjustable from about 1 hertz to 4 hertz. The modulator 2 works in such a way that the current supplied to the oscillators is reduced during the negative phase of the wave form coming out of the oscillator 1.

The two frequency shifting outputs represent more than a mere duplication of effect. The upper frequencies produce a chilling, nerve-jangling effect on birds, although being out of range to the human ear. Properly selected lower frequencies are imitative of a bird in distress, so that the combination of the nerve-jangling upper frequency with the distressful lower frequency is extremely effective for repelling birds. As a result of the reduction in current in both oscillators 3 and 4, their frequencies are shifted down to lower settings then returned to the base frequencies alternately with every half cycle of oscillator 1. The resulting audio coming out of the loud speaker 7 is a composite two tone signal pulsating between two sets of frequencies at the rate set for oscillator 1.

Figure 2:
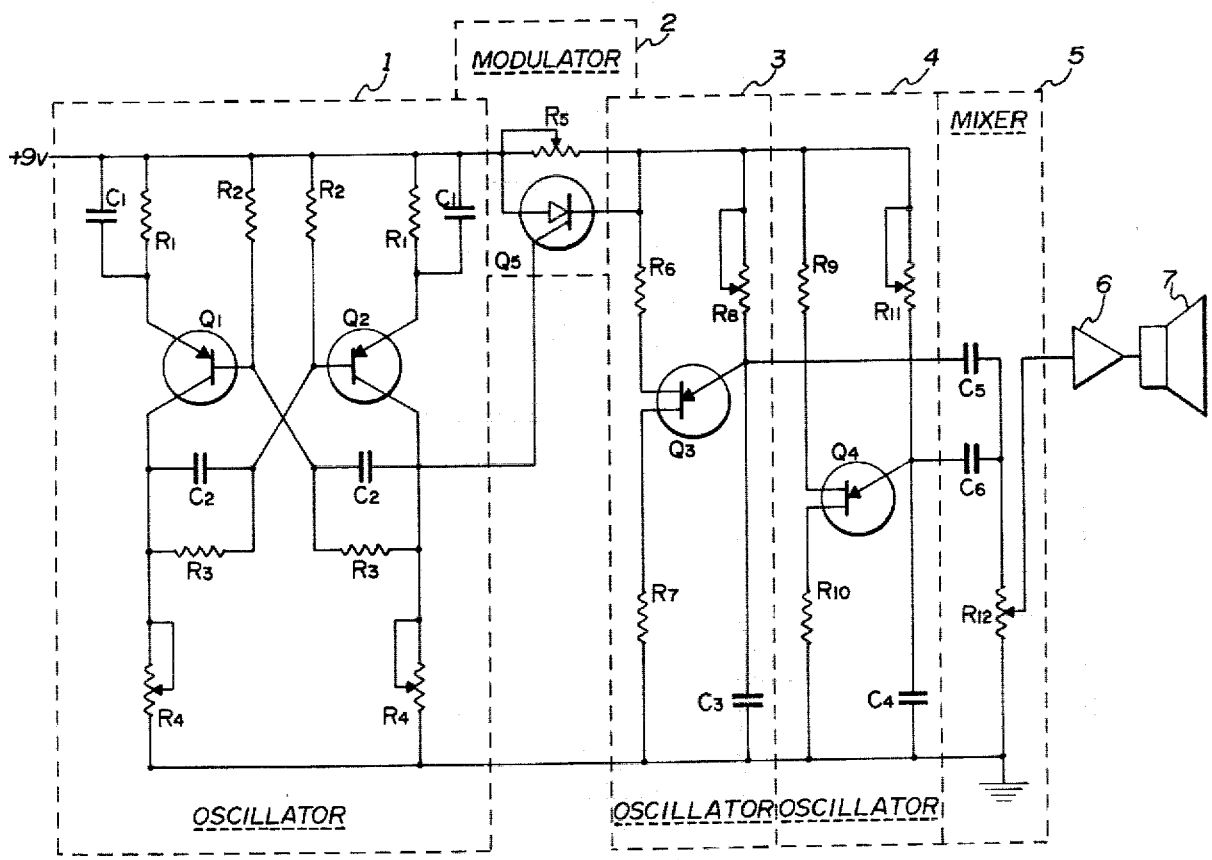
FIG. 2 is the electrical schematic of the novel components of the invention.

As illustrated in FIG. 2, oscillators 3 and 4 are implemented with two uni-junction transistors Q3 and Q4 delivering a saw-tooth shaped signal on their emitter terminals. The base frequency of each oscillator can be set by trimming the adjustable resistors R8 and R11, respectively. In the mixer 5 the oscillator's outputs are AC coupled through capacitors C5 and C6 to a potentiometer R12. The signal level applied to the amplifier 6 is set by the position of the arm of the potentiometer R12. The current supplied to the oscillators 3 and 4 is run through an adjustable resistor R5 which is shunted by a SCR device Q5. The gate terminal of the SCR is driven by the output of a push-pull oscillator formed by transistors Q1 and Q2. The half cycle periods and the frequency of the oscillator 1 can be adjusted by trimming resistors R4 which constitute the collector loads of transistor Q1 and Q2. During the half period of oscillator 1 when transistor Q2 is cut off, the controlling gate voltage applied to SCR Q5 drops toward zero volts. This, in turn, greatly reduces or completely cuts off the flow of current through Q5. During the second half cycle of oscillator 1 when the transistor Q2 is open, the controlling gate voltage of Q5 is increased and the resulting opening of Q5 effects a virtual shunting of adjustable resistor R5. The resistor R5 is preferably a ten turn potentiometer which allows a fine tuning of the frequency shift imposed on oscillators 3 and 4.

The device can be provided commerically as a small pocket sized unit or a larger table model, and the number of frequencies swept could be more than two. Also, although the disclosed unit is variable in frequencies and sweep rate, commercial units would ordinarily be set at the factory with frequencies and sweep rates tailored specifically to repel particular types of pests, such as dogs, cats, birds or mosquitos.

It will be readily be understood that the various subcomponents of this embodiment could be implemented by other equivalent electronic circuits and that various modifications may be made without departing from the spirit of the invention and the scope of the appended claims.

The invention claimed is:

1. A pest repelling apparatus which comprises;
   means for simultaneously emitting at least first and second audio signals;
   means for simultaneously and periodically shifting the frequency of each of said first and second signals from a base frequency to a lower frequency and vice versa;

wherein said means for simultaneously emitting comprises:
a first oscillator;
a second oscillator;
a power amplifier having its input terminal AC coupled to the outputs of said first and second oscillators; and
a loud speaker driven by the output signal of the amplifier;
said means for simultaneously and periodically shifting frequencies comprise:
a resistive load in series with the supply line of said first and second oscillators; and
means for periodically shunting said resistive load.

2. A pest repelling apparatus which comprises:
means for simultaneously emitting at least first and second audio signals;
means for simultaneously and periodically shifting the frequency of each of said first and second signals from a base frequency to a lower frequency and vice versa;
base frequency setting means affecting only the first audio signal;
base frequency setting means affecting only the second audio signal;
means for simultaneously adjusting the frequency range sweep of said first and second signals;
said means for simultaneously emitting comprising:
a first oscillator;
a second oscillator;
a power amplifier having its input terminal AC coupled to the outputs of said first and second oscillators;
a loud speaker driven by the output signal of the amplifier;
said means for simultaneously and periodically shifting frequencies comprising:
a resistive load in series with the supply line of said first and second oscillators;
means for periodically shunting said resistive load;
wherein said means for shunting comprise:
a third oscillator; and
a current switching device in parallel with said resistive load responsive to the output signal of said third oscillator.

3. The apparatus claimed in claim 2 wherein said third oscillator is a push-pull oscillator; and
said current switching device is a SCR having its gate terminal connected to one of the transistor collectors in said third oscillator.

4. The apparatus claimed in claim 3 wherein the frequencies of said first and second signals are shifted from one to four times per second.

5. The apparatus claimed in claim 3 wherein the first signal has a base frequency adjustable up to 25 kilohertz; and
the second signal has a lower frequency adjustable down to 8 hertz.

* * * * *